United States Patent Office 3,655,845
Patented Apr. 11, 1972

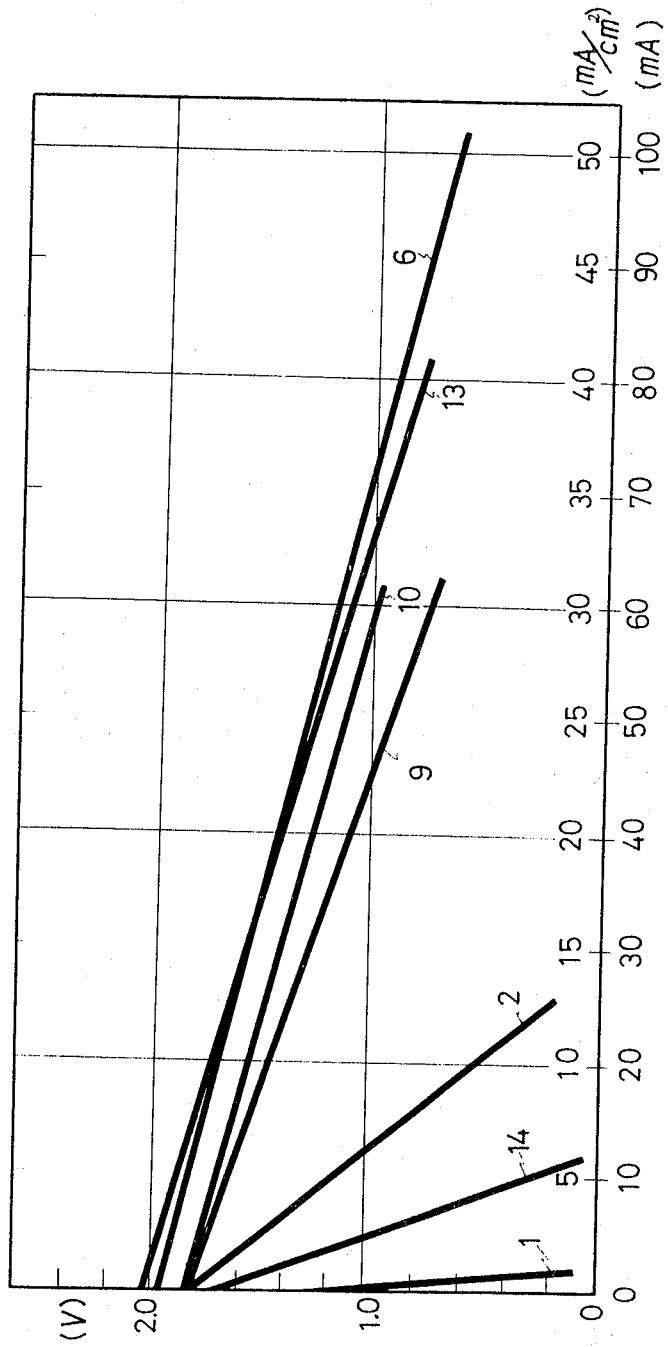

3,655,845
HEATING A SINTERED ALUMINA ARTICLE IN ATMOSPHERE CONTAINING SODIUM OR POTASSIUM IONS
Takewo Chiku, Toyota-shi, Japan, assignor to Kabushiki Kaisha Toyota Chuo Kenkyusho, Nagoya-shi, Aichi-ken, Japan
Filed July 29, 1969, Ser. No. 845,694
Claims priority, application Japan, Aug. 10, 1968, 43/56,831
Int. Cl. C04b 35/10, 35/64, 41/02
U.S. Cl. 264—82
10 Claims

ABSTRACT OF THE DISCLOSURE

A method for producing a permeable product of the beta-alumina type capable of passing sodium and/or potassium ions and primarily useful as the separator in a battery cell, comprising the steps of forming an alpha-alumina sintered member into a desired shape, placing said sintered member in an alkali metal atmosphere, e.g., sodium potassium, or oxides thereof at an elevated temperature, and diffusing the alkali metal or its oxide into said alpha-alumina member, whereby to form an ion permeable separator having a dense structure and sufficient strength for its intended use.

BACKGROUND OF THE INVENTION

The present invention relates to an ion permeable product and the method of making the same, and more particularly to an alpha-alumina sintered member having an alkali metal or its oxide diffused therein to form a product capable of selectively passing sodium or potassium ions therethrough.

The ion-permeable product comprising the subject matter of this invention is useful, and required, as a solid reaction zone separator for a battery cell as, for example, in a molten sodium-sulphur cell to produce an output energy per unit weight many times higher than those of conventional cells having the same, or different electrolytes. In a sodium-sulphur cell such a separator must be capable of perfectly separating the sodium and sulphur electrolytes and yet must pass sodium ions therethrough during the charging and discharging cycles. A potassium-sulphur cell requires a similar separator which will pass potassium ions therethrough and simultaneously keep the electrolytes apart.

Although beta-alumina is known as material capable of passing sodium and potassium ions, it has heretofore been extremely difficult to produce a beta-alumina sintered product having the requisite structural properties and density required for use as a separator in a high temperature battery cell. For obtaining a beta-alumina sintered product, beta-alumina powder is conventionally pressed and sintered at a temperature above 1600° C. in an ordinary atmosphere. However, since beta-alumina converts into alpha-alumina ($Al_2O_3$) at a temperature above 1400° C. an alpha-alumina separator is produced before sintering is completed. Thus, a battery separator plate having the desired porosity, strength and denseness of structure is not obtained using the conventional process.

If, with difficulty, as sometimes occurs, a beta-alumina separator plate is produced, it is weakened by defects such as cracks appearing in many portions and probably caused by shrinkage. Similarly, when the casting method is used to form beta-alumina products, such castings are porous and brittle.

SUMMARY OF THE INVENTION

The present invention overcomes the above described difficulties thereby providing a selectively ion-permeable alumina product especially useful as a battery separator. The method comprises first forming a sintered alpha-alumina article, and then subjecting the same to a high temperature atmosphere effective to diffuse sodium, potassium, or an oxide thereof into the alpha-alumina structure, thereby yielding a product having substantially the same properties as beta-alumina insofar as capability of passing sodium, or potassium ions is concerned, and having high density and strength.

It is accordingly apparent that a primary object of the present invention is to provide an alumina product having the desired permeability properties of beta alumina, and a method for producing said product.

Another object of the present invention is to provide an alumina composition and a method for producing the same, said composition having a dense structure and a high strength.

A further object of the invention is to form an alumina composition, having the above described characteristics, by diffusing sodium, potassium, or an oxide thereof into alpha-alumina.

A still further object of the invention is to provide a permeable alumina product, having the above described characteristics, by means of a method which is relatively easy and inexpensive to perform.

As used throughout this document, beta-alumina (β-alumina) is defined as a crystalline material having layers of $Al_2O_3$ connected by Al—O bonds wherein sodium or potassium ions reside between the layers and bonds. Where sodium is present the general formula of beta-alumina (β-alumina) may be shown as

$$Na_2O.11Al_2O_3$$

hereinafter termed sodium beta-alumina (Na β-alumina). According to Bragg, it is represented by the formula,

$$Na_2Al_{23}O_{35}$$

Similarly, the general formula of potassium beta-alumina (K β-alumina) may be shown as $K_2O.11Al_2O_3$, and hereinafter is termed potassium beta-alumina.

BRIEF DESCRIPTION OF THE DRAWING

The novel features which are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawing, wherein the single figure is a graph showing the voltage-current curves of a sodium-sulphur cell in which a separator plate prepared in accordance with the present invention is used as a solid reaction zone membrane, or separator.

DESCRIPTION OF PREFERRED EMBODIMENTS

For preparing an alumina product according to the present invention, a method may be used in which sodium, or an oxide thereof, is diffused into alpha-alumina in accordance with the following described steps.

(1) Alpha-alumina powder is poured into a two-part mold shaped to form a product having the desired size and configuration. The mold parts are pressed together in a conventional manner, and the resultant product is placed in a furnace at a temperature from about 1600° C. to 2000° C. for a sufficient time to obtain a sintered alpha-alumina product. Alternatively, a sintered block can be first produced and then cut to the product shape desired.

(2) Next, an atmosphere of sodium or an oxide thereof, is prepared and the alpha-alumina sintered product is placed in said atmosphere and kept at a temperature appropriate for diffusion of the sodium, or the oxide, into the alpha-alumina sintered product. A suitable range of temperature for this diffusion is from about 1400° C. to 1700° C. while the time period for diffusion may range from 1 to 12 hours. The sodium, or oxide thereof, diffuses into the alpha-alumina sintered product and a product containing Na β-alumina results.

During diffusion, the generated sodium, or sodium oxide, penetrates the sintered alpha-alumina structure in the elemental sodium (Na) or ionic form (Na+). When the sodium atmosphere is generated sufficient air must be provided by maintaining the furnace in open-air state, or by supplying air into the heating furnace.

It is very important to select the temperature most appropriate for the diffusing treatment. If the diffusion temperature is too high, the Na β-alumina formed decomposes and reconverts back into alpha-alumina. However, it has been found that such decomposition depends on the concentration of the diffusion atmosphere, such that, as the concentration of alkali metal, or alkali metal oxide increases, a higher temperature for decomposing is required. For example, decomposition of the beta-alumina will occur at a temperature of about 1900° to 2000° C. when subjected to a sodium, or sodium oxide atmosphere. For this reason the diffusion temperature is preferably kept between 1400° C. and 1700° C. to be certain that decomposition of the beta-alumina will not occur and so that the diffusion of sodium, or the sodium oxide into the alpha-alumina is accelerated. Above 1700° C. the beta-alumina may begin to convert to its alpha state. Below 1400° C. diffusion time becomes excessive and a satisfactory product cannot be obtained.

Any appropriate conventional means can be employed for preparing an atmosphere of sodium, or the oxide thereof. For example, the atmosphere may be obtained by heating sodium, or sodium compounds such as $Na_2CO_3$, $Na_2O_2$, $NaAlSiO_4$, $3Na_2O \cdot As_2O_5$, $Na_2O \cdot Ta_2O_5$, $$3Na_2O \cdot P_2O_5$$

$NaNbO_3$, $NaZrSiO_5$, $NaAlO_2$, or the like.

When the aforementioned sodium compounds are heated in an open-air state, melting or decomposition occurs as the temperature is elevated. The vapors generated may, therefore, escape before an adequate quantity is sufficiently diffused into the alpha-alumina structure. To prevent this, an appropriate lid should be provided to keep the generated gas, or vapors in the neighborhood of the alpha-alumina sintered product, removing only an excessive amount of gas to prevent pressure build-up. Also, by retaining the temperature of the sodium compounds at or about their melting, or decomposing temperatures, escape of such gas may be minimized. In this manner, the generated sodium, or sodium oxide gas can be continuously supplied to envelop the alpha-alumina for diffusion therein without having to add additional sodium compounds. Also, alumina can be used to absorb excessive gas and to release the same when it is in short supply and needed for diffusion into the alpha-alumina sintered product.

Any appropriate means for producing the required atmosphere may be utilized so long as a sufficient amount of sodium, or sodium oxide is continuously available for diffusion into the alpha-alumina during the treatment. For example, when a reversal flame-type heating furnace is used, the alpha-alumina sintered product is placed in said furnace and the furnace kept at a temperature between 1400° C. and 170° C. Sodium carbonate ($Na_2CO_3$) is placed in the neighborhood of the burner and is heated to its decomposition temperature of about 900° C. As a result, the generated gas is continuously supplied into the furnace kept at 1400° C. to 1700° C., while the remaining gas, or excess, can be removed from the chimney opening at the bottom of the furnace.

Alternatively, the process of the present invention can be carried out by placing the sintered alpha-alumina article in an admixture of a powdered sodium compound and powdered alpha-alumina, raising the temperature to a range between 1400° C. and 1700° C. during which time oxygen, preferably in the form of air, is supplied to the powdered mixture. Alpha-alumina powder has a melting point above 1700° C. and is preferably admixed with sodium providing a reservoir of vaporized sodium, or sodium oxide, resulting in minimum escape of the vaporized gases at the diffusion temperature. For example, a number of alpha-alumina sintered plates were immersed in a powdered admixture of sodium carbonate and alpha-alumina. Test sample plates numbered from 1 to 17 as in the following Table I were obtained by varying the powdered mixtures and the diffusion temperatures.

TABLE I

| Ratio of $Na_2CO_3$ to alpha-alumina by weight | Temperature (° C.) | Time (hr.) | Increase in weight (percent) | Plate No. |
|---|---|---|---|---|
| 3:7 | 1,500 | 1 | 2.1 | 1 |
|  |  | 9 | 6.5 | 2 |
|  |  | 12 | 8.6 | 3 |
| 5:5 | 1,400 | 12 | 9.2 | 4 |
|  | 1,450 | 3 | 8.2 | 5 |
|  |  | 9 | 13.5 | 6 |
|  | 1,500 | 1 | 6.0 | 7 |
|  |  | 6 | 7.1 | 8 |
|  |  | 9 | 9.7 | 9 |
|  |  | 12 | 12.0 | 10 |
|  | 1,550 | 1 | 8.4 | 11 |
|  |  | 3 | 10.2 | 12 |
|  |  | 6 | 14.2 | 13 |
| 3:2 | 1,500 | 3 | 5.3 | 14 |
|  |  | 6 | 7.7 | 15 |
|  |  | 9 | 9.6 | 16 |
|  |  | 12 | 12.1 | 17 |

Admixed powders of sodium carbonate and alpha-alumina prepared in the weight ratios shown in the first column of Table I and having a total weight, in each case, of 300 grams, were placed into a gas-tight Tammann tube. Several high purity alpha-alumina plates shaped and sintered at 1700° C. were laid therein and electrically heated to from 1400° C. to 1550° C. for a period ranging from 1 to 12 hours. Each plate was about 38 mm. long, 30 mm. wide, and 0.6 mm. thick, and weighed 2.6 grams.

As is apparent from Table I, the weight increase of plates 1–17 increased proportionately to the diffusion time (see plates 1, 2 and 3) and temperature (compare plates 4 and 10, or 5 and 12). Also, the concentration of sodium in the admixed powder was increased, the diffusion time was shortened to obtain about the same weight increase (compare plates 2 and 7).

When the plates of Table I were analyzed by X-ray refraction, their composition was determined to be mostly Na β-alumina (i.e., $Na_2O \cdot 11Al_2O_3$) with a small amount of sodium aluminate ($Na_2O \cdot Al_2O_3$) present, and the remainder being alpha-alumina. From the foregoing tests it was discovered that the diffusion treatment increased the weight of the specimen from about 2% to almost 15% by weight. Further, it was found that even a small increase in weight as, for example, 5.3% (plate 14) yielded a significant conversion, i.e., 52% of alpha-alumina to the beta form. The percentage of beta-alumina formed was found to be almost proportional to the weight increase of the treated plate. For example, the beta-alumina concentration in plate No. 2 is 54% by weight; that of No. 9 is 87%; that of No. 14 is 52%; that of No. 15 is 56%; and that of No. 16 is 78%.

To test the effectiveness of the plates of Table I as a battery separator, plates 1, 2, 6, 9, 10, 13 and 14 as prepared above were washed with water and placed in sodium-sulphur battery cells and measurements taken. Each cell comprised a container having a separator, or partition, formed of one of said plates, with molten sodium placed on one side of the separator and molten sulphur on the other, as the electrolytes, and thereafter maintained at 300° C. Conductive electrodes were inserted into the sodium and sulphur, respectively, to complete the cell. To obtain discharge curves, the two electrodes were short-circuited through a fixed external electrical resistance. As shown in the drawing, a series of lines, each representing a different plate corresponding to the number listed in Table I were plotted, wherein the ordinate of the graph represents terminal voltage (V), the upper abscissa represents current density (ma./cm.$^2$) and the lower abscissa represents current (ma.).

After discharge was carried out, the cells were found capable of being recharged by passing current through the two electrodes in the opposite direction to that of the discharging. After recharge, the discharge may again be carried out in conformance with the same curve shown in the drawing. From this it is recognized that the treated sintered alpha-alumina separators made in accordance with the present invention functioned perfectly in the battery to separate sodium from sulphur, but having the unique property of selectively passing sodium to close the battery circuit in accordance with the general chemical reaction: $2Na+S \rightleftharpoons Na_2S$.

Thus, it was found that the performance of a sodium-sulphur battery cell relates directly to the ability of the battery separator to be selectively permeable to alkali metal ions while simultaneously being impermeable to the molten electrolytes in the elemental or anionic state. When the separator, e.g., sodium beta-alumina, is formed in accordance with the procedures outlined hereinabove it possesses the property of being selectively permeable to both potassium and sodium ions. However, when the separator had less than 30% by weight of the beta structure present therein it would not perform effectively. Also, the ability of the sintered alpha-alumina separator to pass such ions was found to be critically dependent on the quantity of alkali metal, or alkali metal oxide diffused into the separator structure. Battery cells prepared with treated separators having about a 6% or more weight increase after diffusion are preferred. Cells made with plates 1 and 14, having less than 6% diffused sodium, or sodium oxide, displayed open-circuit voltages of between 1 to 2 volts which dropped to almost zero upon discharge.

In the foregoing paragraphs the invention has been explained in detail as related to the diffusion of sodium, or a sodium oxide, into a sintered alpha-alumina body. The chemical properties of potassium are very similar to those of sodium, and K β-alumina and Na β-alumina have the same crystalline structure. Consequently, the same means and method for diffusing sodium, or an oxide into alpha-alumina, can be applied as the means for diffusing potassium, or an oxide thereof, into alpha-alumina. In this manner, plates mainly composed of K β-alumina can be formed for use as battery cell separators.

Plates similar to those shown in Table I, but containing potassium, or potassium oxide, diffused into a sintered alpha-alumina substrate were made by the same process as described above for the plates of Table I, except that a suitable potassium compound was used therewith. For example, the sintered alpha-alumina product was laid in an admixture of the powdered potassium carbonate ($K_2CO_3$) and alpha-alumina powder. Similar increases in weight of each of the plates was noted as was the case of the sodium diffused plates, and the treated plates were analyzed to comprise a major portion of K β-alumina formed as a result of the diffusion. These plates were used as separators in potassium-sulphur battery cells and had similar characteristics to those of the sodium system.

To generate a potasium, or potassium oxide atmosphere, potassium, or potassium compounds such as $K_2CO_3$, $K_2O_2$, or $KAlO_2$ can be used. Preferably the temperature for diffusing the potassium or its oxide into the alpha-alumina structure is from 1400° C. to 1700° C. as in the described case for diffusing sodium. All the other conditions employed in the making of sodium diffused plates are substantially the same for making potassium, or potassium oxide, diffused plates. When formed, the plates containing diffused potassium, or potassium oxide, have the property of passing sodium ions as well as potassium ions therethrough.

It will be apparent from the preceding description that in accordance with the present invention, a sintered alpha-alumina article subjected to an alkali metal, or alkali metal oxide atmosphere such as sodium, potassium, or an oxide thereof, at a temperature ranging from 1400° C. to 1700° C. for a predetermined length of time will be considerably modified by the formation of a composition composed of primarily a beta-alumina structure. The resultant product has the property of readily passing sodium, or potassium ions and has a dense structure of sufficient strength to act as a separator in a battery cell. The diffusion treatment, even though performed at a high temperature, results in a stable alpha-alumina product preferably having from about 50% to 90% by weight beta-alumina formed therein. Thus, a product having excellent permeability properties to metal ions such as sodium ions and potassium ions, which cannot be obtained by conventional methods, can easily be obtained by the method of the present invention. Simultaneously, the product yields a dense and strong structure capable of being employed as a battery separator.

Comparing the physical properties of the product of the present invention to that of a single crystal of beta-alumina it was found that the density of the product ranged from 2.6 to 3.0 g./cm.$^3$, while the single crystal measured 3.25 g./cm.$^3$. Physically, the product had greater strength since the single crystal is formed of layers which separate along cleavage planes.

We claim:
1. A method for producing a product of the beta-alumina type and having the property of passing sodium and potassium ions therethrough, which comprises subjecting a non-permeable sintered article consisting essentially of alpha-alumina to a diffusing atmosphere comprising a vapor selected from the group consisting of sodium, potassium, and their oxides, at a temperature in the range of about 1400° C.–1700° C. until at least about a 6% weight gain in the sintered article is achieved and whereby the alpha-alumina is converted from a non-permeable structure to a permeable structure.

2. A method according to claim 1, wherein said diffusing atmosphere is prepared by heating a sodium containing material in the presence of oxygen.

3. A method in accordance with claim 2, wherein said sodium containing material is taken from the group consisting of sodium, $Na_2CO_3$, $Na_2O_2$, $NaAlSiO_4$, $3Na_2O \cdot As_2O_5$, $Na_2O \cdot Ta_2O_5$, $3Na_2O \cdot P_2O_5$, $NaNbO_3$ $NaZrSiO_5$, and $NtAlO_2$.

4. A method in accordance with claim 3, wherein said sintered alpha-alumina article is immersed in a powdered admixture of alpha-alumina powder and a powder taken from the group consisting of sodium, a sodium compound and mixtures thereof, and heated to a temperature ranging from about 1400° C. to 1700° C.

5. A method in accordance with claim 4, wherein the weight ratio of said sodium compound to alpha-alumina powder ranges from 3:7 to 3:2.

6. A method in accordance with claim 1, wherein the said diffusing atmosphere is prepared by heating a potassium containing material in the presence of oxygen.

7. A method in accordance with claim 6, wherein said potassium containing material is taken from the group consisting of potassium, $K_2CO_3$, $K_2O_2$ and $KAlO_2$.

8. A method in accordance with claim 7, wherein said alpha-alumina sintered product is immersed in a powdered admixture of alpha-alumina powder and a powder taken from the group consisting of potassium, a potassium compound and mixtures thereof, and heated to a temperature ranging from about 1400° C. to 1700° C.

9. A method according to claim 8, wherein the weight ratio of said potassium compound to alpha-alumina powder ranges from about 3:7 to 3:2.

10. A method according to claim 1, wherein is added the step of washing the obtained article with water.

References Cited

UNITED STATES PATENTS

| | | | |
|---|---|---|---|
| 3,294,877 | 12/1966 | Hammond et al. | 264—65 |
| 3,404,036 | 10/1968 | Kummer et al. | 136—153 |
| 3,427,373 | 2/1969 | Matsuo et al. | 264—65 |
| 3,446,669 | 5/1969 | Arrance et al. | 106—65 |
| 3,446,677 | 5/1969 | Tennenhouse | 136—153 |
| 3,468,719 | 9/1969 | Tennenhouse | 106—65 |
| 3,475,225 | 10/1969 | Tennenhouse | 106—65 |
| 3,488,271 | 1/1970 | Kummer et al. | 204—180 |
| 3,515,679 | 6/1970 | Gaeth et al. | 252—477 |

DONALD J. ARNOLD, Primary Examiner

J. H. MILLER, Assistant Examiner

U.S. Cl. X.R.

106—65; 264—65, 340

UNITED STATES PATENT OFFICE
CERTIFICATE OF CORRECTION

Patent No. 3,655,845     Dated April 11, 1972

Inventor(s) Takewo Chiku

It is certified that error appears in the above-identified patent and that said Letters Patent are hereby corrected as shown below:

Column 6, line 69, "NtAlO$_2$" should read -- NaAlO$_2$ --.

Signed and sealed this 24th day of October 1972.

(SEAL)
Attest:

EDWARD M. FLETCHER, JR.
Attesting Officer

ROBERT GOTTSCHALK
Commissioner of Patents